July 3, 1956  J. H. VICTOR  2,753,199
GASKET
Filed May 21, 1952
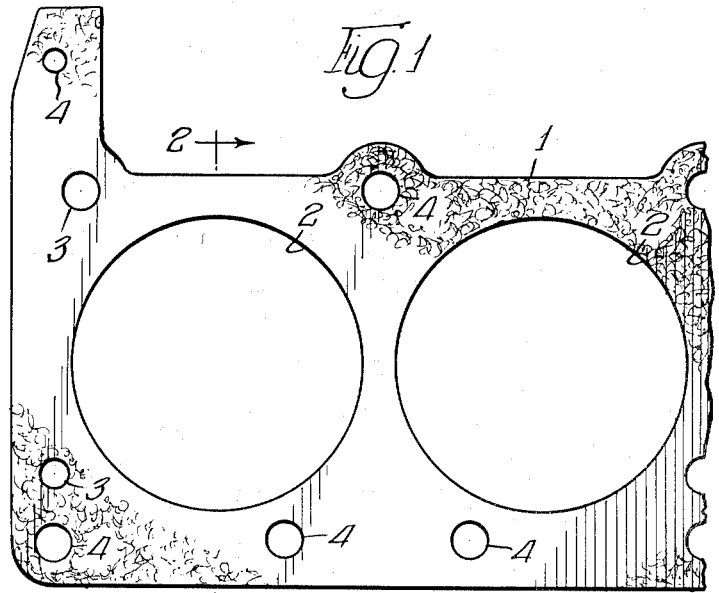
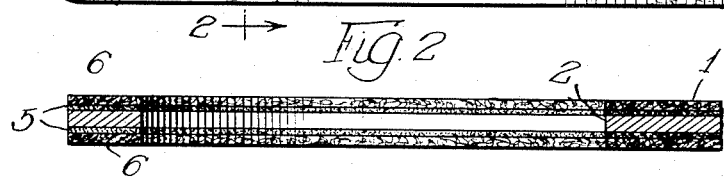
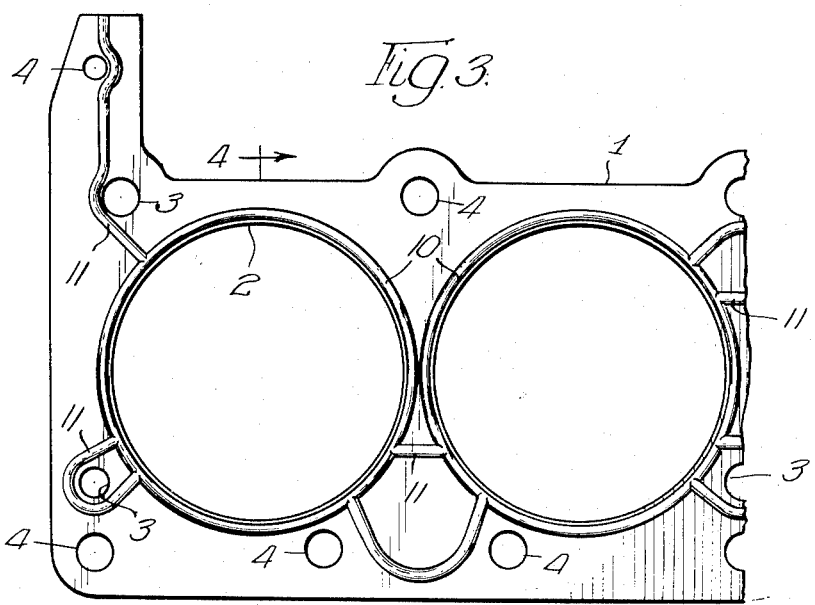
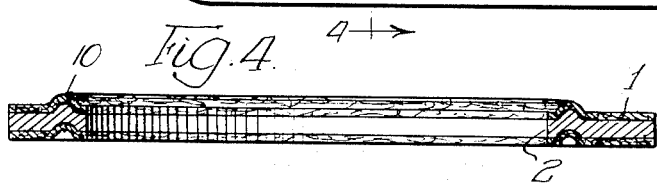
INVENTOR.
John H. Victor,
BY George I. Haight &
George H. Simmons
ATTYS

United States Patent Office 2,753,199
Patented July 3, 1956

2,753,199

GASKET

John H. Victor, Wilmette, Ill., assignor to Victor Manufacturing & Gasket Co., Chicago, Ill., a corporation of Illinois Application May 21, 1952, Serial No. 289,051

1 Claim. (Cl. 288—21)

This invention relates to gaskets and has for its principal object the provision of a new and improved device of this kind.

It is a main object of the invention to provide a thin heat-resistant gasket particularly adapted to seal cylinder heads on the blocks of high compression ratio internal combustion engines.

Another object of the invention is to provide a gasket composed of a planar sheet of metal, to the faces of which protective coatings are bonded to protect the gasket from the heat of combustion in the engine and from deterioration through corrosion produced by coolants and other fluids which come into contact with the gasket.

Another object of the invention is to provide a coating material for a sheet metal gasket that is bonded thereto so as to permit beading the metal without damage to the coating.

Another object of the invention is to provide a coating material for a sheet metal gasket, which material is capable of aiding in the formation of a seal between the machine parts with which the gasket is used, so that beading of the metal may not be necessary to the formation of a fluid tight seal.

Still another object of the invention is to provide a coating material for gaskets that can be manufactured and applied at low cost without sacrificing quality.

Further objects of the invention not specifically mentioned here will be apparent from the detailed description and claim which follow, reference being had to the accompanying drawings in which a preferred embodiment of the invention is shown by way of example and in which:

Fig. 1 is a plan view of a portion of a typical cylinder head gasket employing the teachings of the invention;

Fig. 2 is a cross sectional view taken along the line 2—2 of Fig. 1, looking in the direction of the arrows and drawn to an enlarged scale;

Fig. 3 is a plan view of a portion of a typical beaded gasket; and

Fig. 4 is a cross sectional view taken along the line 4—4 of Fig. 3, looking in the direction of the arrows.

Manufacturers of high compression ratio internal combustion engines demand an extremely thin gasket for forming a seal between the engine block and the cylinder head. Since the adjacent surfaces of the block and head are merely commercially smooth, that is they are not lapped and polished to true planar condition, an ordinary sheet metal gasket will not form and maintain a satisfactory seal between these parts. To meet this situation it has heretofore been the practice to form in a sheet metal gasket a series of ribs or beads surrounding the combustion openings, coolant openings, and the like. These beads, which rise out of the plane of the metal a distance equal to two or more times the thickness of the metal, are adapted to be squeezed back into substantial registration with the faces of the metal as the head is tightened in place upon the block. Through this arrangement satisfactory seals between the head and block are achieved notwithstanding slight imperfections in the surfaces thereof.

Sheet metal gaskets of this type are usually formed of steel, and since the edges of the gasket surrounding the combustion openings are subjected to the full heat of combustion and in addition to the products of combustion which oftentimes are somewhat acid in nature, and since the gaskets are in contact with the coolant of the motor, deterioration of the unprotected metal will be relatively rapid and as a result the satisfactory life of the gasket comparatively short. To combat this, it has been the practice heretofore to coat the two faces of the gasket with a coating material which protects it from deterioration and thus materially lengthens the satisfactory, useful life of the gasket.

The present invention provides an improved, thin cylinder head gasket primarily, although its teachings may be equally well applied to gaskets for other uses.

In accordance with the present invention, the gasket body is punched out of sheet metal, preferably steel, and, as will be seen in Fig. 1, this body 1 contains combustion openings 2, coolant openings 3, bolt holes 4, and such other openings as may be required to fit the gasket into the specific engine in which it is designed to be used. Steel of thin gauge, in one instance fifteen thousandths of an inch in thickness, is used for this purpose.

After the gasket is thus formed, a protective coat 5 of thermosetting resinous material is applied to each face of the body. This application can be performed either by roll coat applicators or dipping or spraying.

This coating is relatively thin, preferably having a thickness of approximately one thousandth of an inch.

While this coating is still fresh and tacky, finely comminuted inorganic filler materials, such as powdered asbestos, fibrous magnesium silicate, glass fibre, rock wool, diatomaceous earth, or like material, is applied to the coating, as indicated at 6 in Fig. 2. The inorganic material may be applied by dusting, spraying, or the like, and preferably is built up to a thickness of from five to six thousandths of an inch on each face of the gasket.

The thus coated gasket is then cured by an application of heat, the degree of temperature of which depends upon the nature of the coating material used for a length of time sufficient to preliminarily set the coating material. This bonds the inorganic filler material to the metal and results in a heat-resistant coating on the faces of the gasket, a coating which also renders the metal of the gasket less susceptible to corrosion.

When the gasket thus made in accordance with the teachings of the present invention is applied to seal the cylinder head on the block of an internal combustion engine and the engine is operated, the heat generated further cures the coating material, softening it somewhat during the process so that the material flows into small interstices in the sealing surfaces and forms a fluid tight seal between the block and head. The edges of the metal adjacent the combustion openings are protected from the heat of combustion by the thin wall of heat-resistant coating material and, as a result, the gasket is capable of maintaining a satisfactory seal between the block and head for a long period of time.

The particular composition of the thermosetting resin used in the coating material may be varied within the teachings of my invention to meet specific requirements. In one instance, the coating material consisted of 38½% alkyd resin, which is a condensation polymer of phthalic anhydride and glycerine; 8% urea formaldehyde resin; 3.4% castor oil, which acts as a plasticizer; and 50.1% of a blend of 4¼ parts of xylol and ½ part of butanol. Gaskets coated with this material, to which powdered inorganic fillers were applied, were cured by heating in a ventilated oven for twenty (20) minutes at 320° F. After this treatment, the powdered filler material was bonded to the metal sufficiently to permit handling the gasket without substantial loss of inorganic filler therefrom.

In a second example, the thermosetting resin used consisted of 40% epon resin, a condensation polymer of bisphenol and epichlorohydrin; 4½% melamine resin; 4½% thio ester; and 51% solvent consisting of a blend of 3½ parts of mineral spirits, 1 part of butanol, and ½ part of xylol. This coating material, with the powdered inorganic filler attached thereto, was cured in an oven for twenty (20) minutes at 320° F. The filler material is bonded to the metal and the gasket capable of being handled without substantial loss of powdered material therefrom.

In another instance the coating material consisted of 42% phenolic resin, a polymerization product of phenol and formaldehyde; 8½% urea formaldehyde resin; 4½% castor oil plasticizer; and 45% solvent consisting of a blend of ½ part of xylol and 4 parts of butanol. A coating material in this instance was cured in an oven for twenty (20) minutes at 320° F.

Each of the foregoing formulae produces a coating on the thin metal gasket capable of forming a seal between the block and head of a high compression ratio internal combustion engine without beading the metal. The coating material when cured by the heat developed in the engine does not stick to the engine parts objectionably, and when removal of the gasket becomes necessary a minimum of cleaning up of the sealing surfaces preparatory to the installation of a new gasket is required. If desired, coated gaskets containing the coated material of the above formulae may be beaded after coating without an objectionable loss of coating material; however, I prefer to use the gasket in its planar or unbeaded state.

In Figs. 3 and 4, there is shown a gasket similar to the one shown in Fig. 1, but with beads formed therein. This gasket has combustion openings 2, coolant openings 3, and bolt holes 4, as before. After the coating material and inorganic filler have been applied to and cured on both surfaces of the metal, the gasket is placed in a suitable press and beads 10 around the combustion openings and beads 11 around the coolant openings formed therein. It has been found that the operation of beading the gasket does little or no damage to the coatings when those coatings are as formulated above. The protective coatings thus prolong the useful life of the gasket without loss of the advantages of the beading and also these coatings aid in the formation of a seal between the engine block and head.

In certain instances it may be advantageous to incorporate the inorganic filler material in the coating itself. In one such instance, 100 parts of coating material of any one of the above compositions was used as a base, to which five (5) parts of titanium dioxide to add opacity to the coating were added, thirty (30) parts of asbestos fibre dust were included in the material, ten (10) parts of octyl alcohol were added as a leveler for the film during the baking operation, and thirty (30) parts of xylol were used as a solvent. The sheet metal punching was roller coated with this solution, and after air drying the gasket was baked in an oven at 320° F. for a period of twenty (20) minutes. The coating thus applied to the gasket is somewhat thinner than the combination of a coating material and inorganic filler dust applied thereto, and there is less tendency for the coating to dust off during handling. Gaskets made by this coating process may be beaded, if desired, with substantially no loss of coating therefrom. Furthermore, if desired, after a first coat has thus been applied, other coats may be added and individually baked to cure them, thereby to build up the thickness of the gasket to meet a particular condition.

The gasket shown in Figs. 3 and 4 illustrates this latter type of coating wherein the fibers are incorporated in the coating solution. This showing is not intended to limit the beading to gaskets coated in this manner, as gaskets coated under the other formulae may also be beaded with little or no loss of the fibrous material therefrom.

Gaskets made in accordance with the teachings of the present invention, both beaded and unbeaded, are capable of forming and maintaining a satisfactory seal over a long period of time. The heat-resistant characteristics of the gasket are improved over those of a plain beaded metallic gasket or a coated metallic gasket to which no inorganic filler material has been added. Resistance of the gasket to corrosion occasioned by the fluid with which it comes in contact is greatly increased. The cost of producing the gaskets is low.

While I have chosen to illustrate my invention by showing and describing a preferred embodiment of it, and have included specific formulae for use in connection therewith, I have done so by way of example as there are many modifications and adaptations which can be made by one skilled in the art within the teachings of the invention.

Having thus complied with the statutes and shown and described a preferred embodiment of my invention, what I consider new and desire to have patented by Letters Patent is pointed out in the appended claim.

What is claimed is:

A gasket composed of a thin sheet of metal shaped to conform to machine parts with which it is to be used and having openings adapted to register with openings in said parts; a coating bonded to the faces of said metal and comprising the residue, after curing, from a solution consisting of 38.5% alkyd resin, 8% urea formaldehyde resin, 3.4% castor oil, and 50.1% of a blend of 4¼ parts of xylol and ½ part of butanol; and a finely comminuted inorganic fibrous material overlaid on each coating and bonded to the metal by the coating.

References Cited in the file of this patent

UNITED STATES PATENTS

| | | |
|---|---|---|
| 2,060,928 | Damitz | Nov. 17, 1936 |
| 2,116,000 | Peterson | May 3, 1938 |
| 2,171,530 | Balfe | Sept. 5, 1939 |
| 2,238,681 | Dorough | Apr. 15, 1941 |
| 2,280,242 | Kropa et al. | Apr. 21, 1942 |
| 2,289,620 | Bernstein | July 14, 1942 |
| 2,298,079 | Adams et al. | Oct. 6, 1942 |
| 2,392,388 | Joyce | Jan. 8, 1946 |
| 2,455,114 | Cobb | Nov. 30, 1948 |
| 2,695,186 | Balfe | Nov. 23, 1954 |

FOREIGN PATENTS

| | | |
|---|---|---|
| 648,265 | Great Britain | Jan. 3, 1951 |